June 14, 1955 H. BUERGER 2,710,775
VEHICLE WHEEL COVER
Filed Dec. 27, 1952 2 Sheets-Sheet 1
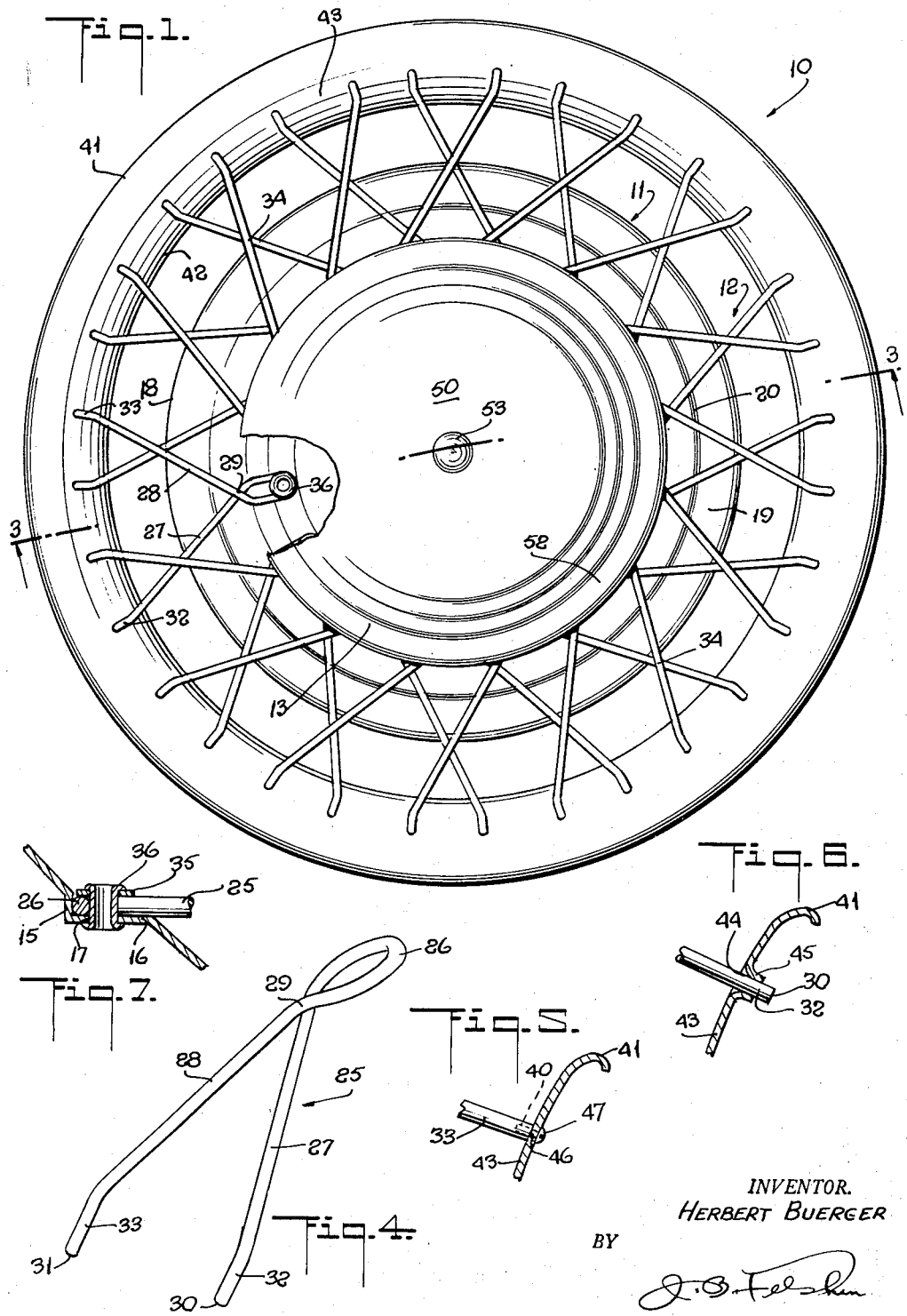
INVENTOR.
HERBERT BUERGER
ATTORNEY

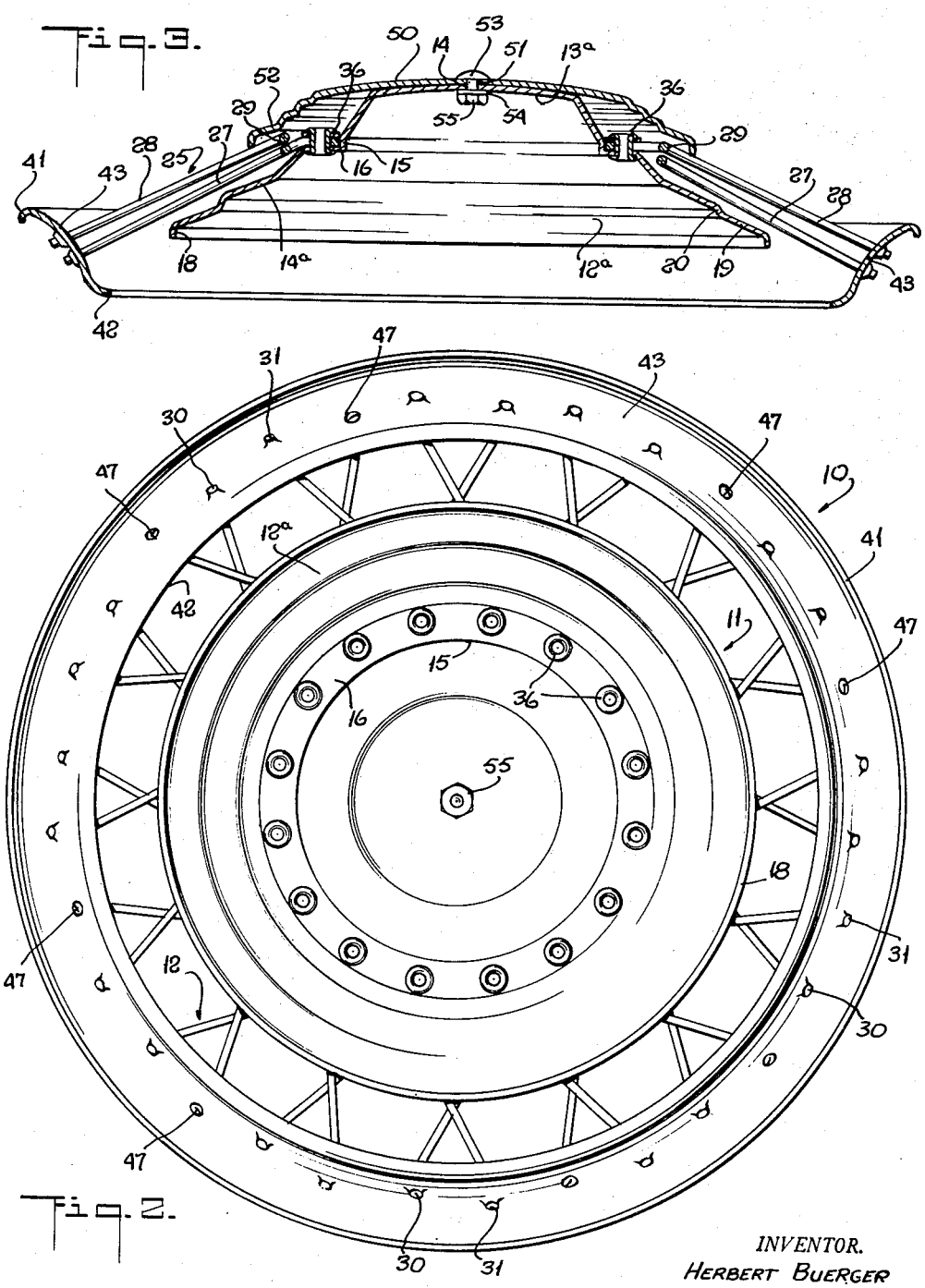

United States Patent Office 2,710,775
Patented June 14, 1955

2,710,775

VEHICLE WHEEL COVER

Herbert Buerger, Walton, N. Y., assignor to Del Krome Corp., Walton, N. Y., a corporation of New York Application December 27, 1952, Serial No. 328,217

13 Claims. (Cl. 301—37)

The present invention relates to vehicle wheels. It is particularly directed to an improved cover assembly for disposition on the outer side of a vehicle wheel.

In the construction of vehicle wheels, it is the prevalent practice to use a wheel disc or plate to secure the wheel rim to the hub, for reasons of economy. However, for purposes of style and appearance, it is preferred to use wire spokes extending from the hub to the rim, as found in custom made and more expensive stock automobiles.

Accordingly it is a principal object of the present invention to provide a cover assembly for a vehicle wheel which comprises generally a hub member, a trim ring, and a plurality of spoke members extending between the hub member and trim ring, and which when positioned on the outer side of a vehicle wheel creates the illusion of a spoked wheel.

It is another object of the present invention to provide a spoked cover assembly; for a vehicle wheel, wherein a pair of spokes are fabricated from a single spoke member by stamping or other method of mass production.

It is still another object of the present invention to provide a spoked wheel cover assembly of the type described which requires a minimum number of fasteners, as the spoke members are inserted through the trim ring under stress, and frictionally held thereby.

It is a further object of the present invention to provide a spoked wheel cover assembly in which the component parts are greatly simplified and reduced in number, to thereby effect substantial savings in labor and materials.

It is still a further object of the present invention to provide a spoked wheel cover assembly of the type described which is simple, attractive and durable, which accomplishes its intended objects, and which can be manufactured and sold at a reasonable cost.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawing in which is shown various illustrative embodiments of this invention:

Fig. 1 is a front elevational view of a wheel cover assembly constructed in accordance with the present invention, with the cover plate partially broken away;

Fig. 2 is a rear elevational view of the wheel cover assembly of the present invention;

Fig. 3 is a sectional view taken on the line 3—3 of Fig. 1;

Fig. 4 is a perspective view of a spoke member of the present invention;

Fig. 5 is an enlarged fragmentary sectional view showing a spoke member fixedly secured to the trim ring;

Fig. 6 is an enlarged fragmentary sectional view showing a spoke member extending through the trim ring; and Fig. 7 is an enlarged fragmentary sectional view showing the spoke member secured to the hub member.

Referring now more particularly to the drawings, the embodiment illustrated therein comprises generally a trim ring 10, a hub member 11, centrally of the trim ring, a plurality of spoke members 12, extending from the hub member 11 to the trim ring 10, and a cover plate 13 mounted on the hub member 11.

The hub member 11 comprises a circular plate 12a, having a raised central portion 13a which is formed with a central aperture 14 for a purpose appearing hereinafter. Extending generally downwardly and outwardly from the central portion 13a of the hub member 11 is a peripheral skirt 14a having an intermediate vertical or wall portion 15, and an outwardly extending horizontal or land portion 16, as viewed in Figs. 3 and 7. The land portion 16 is formed with a plurality of spaced apertures 17 for a purpose appearing hereinafter. Intermediate the land portion 16 and flanged edge portion 18, the skirt may be formed with a plurality of angularly disposed portions, such as 19 and 20, as desired.

Extending generally radially outwardly from the hub member 11 are a plurality of circumferentially disposed spoke members, generally designated 25. Each of the spoke members 25 is preferably fabricated of round wire stock and is formed at its mid-section with a looped or bight portion 26, and a pair of crossing arms 27 and 28, the arms crossing at a point adjacent to the bight portion 26. The arms 27 and 28 are spaced at their cross over point, as at 29 and diverge toward their free ends 30 and 31. The arms 27 and 28 also extend somewhat downwardly from their cross over point as seen in Fig. 3, and have their end portions 32 and 33 bent inwardly into substantial parallelism. Each of spoke members 25 is positioned with their looped midportions 26 resting upon the land portion 16 of the skirt 14 and abutting the wall portion 15, and in registry with one of the apertures 17. Adjacent pairs of spoke members will have their arms 28 crossing over and spaced from the arms 27 of the next adjacent spoke member at a point adjacent to and spaced inwardly from the ends 30 and 31 as at 34. To fixedly secure the spoke members 25 to the hub member 11, a lock washer 35 is positioned overlying each of the looped mid-portions 26 and an eyelet or tubular rivet 36 is inserted through the lock washer 35, spoke member looped portion 26, and the adjacent aperture 17 of land 16, and upset on opposite sides thereof. In the preferred form there are 16 wire spoke members disposed circumferentially about and extending generally radially outwardly from the hub member 11, and every fourth successive spoke member has its end 30 and 31 provided with inwardly extending threaded openings 40, as seen in Fig. 5, for a purpose appearing hereinafter.

The trim ring or rim 10 is annular in configuration, and somewhat S-shaped in section, having outer and inner flanged edge portions 41 and 42, and an intermediate portion 43. The intermediate portion 43 of trim ring 10 is provided with a plurality of circumferentially spaced apertures 44, which apertures are also laterally spaced to receive the end portions 32 and 33 of the laterally spaced arms 27 and 28. Each of the apertures 44 is circumscribed with an outwardly extending flange 45 to provide additional frictional engaging surface for the end portions of the spoke members 25. Intermediate the apertures 44 are provided a plurality of apertures 46, which are adapted to register with the openings 40 in the ends of the fourth successive spoke members. As seen in Fig. 5, the ends of the fourth successive spoke members will abut the trim ring intermediate portion 43, and threaded fasteners or screws 47 extend inwardly through the apertures 46 and threadedly engage in the openings 40 to fixedly secure the ends of the fourth successive spoke members to the trim ring 10. The apertures 44 are so spaced that the arms 27 and 28 must be spread apart for insertion into the apertures. Thus, the spoke members are under stress in their assembled condition, providing additional bearing friction between the end portions of the arms 27 and 28 and the aperture flanges 45 to thereby minimize or dampen any possible vibratory action. In addition, the number of fasteners and their assembly time is minimized to effect substantial savings in the cost of labor and materials.

In order to complete the illusion of a spoked wheel, as well as to protect the central portion of the assembly from road dirt, etc., the cover plate 50 is positioned in overlying relation with respect to the raised hub member portion 13 and the looped mid-portions 26 of the spoke members 25. The cover plate 50 is provided with a central aperture 51 in registry with the aperture 14 of raised portion 13, and has its edge portions 52 extending generally outwardly and downwardly. In order to fixedly secure the cover plate 50 in position, a threaded plug or screw 53 is inserted through the registering openings 51 and 14, and a lock washer 54 and bolt 55 are secured on the inner end of the screw 53.

In view of the foregoing, it will now be understood that the present invention provides a cover for a vehicle wheel which accurately creates the illusion of a spoked wheel, and which embodies features of construction and design which effect substantial savings in the cost of labor and materials.

It will thus be seen that there is provided a device in which the several objects of this invention are achieved and which is well adapted to meet the conditions of practical use.

As various possible embodiments might be made of the above invention, and as various changes might be made in the embodiment set forth, it is to be understood that all matter herein set forth or shown in the accompanying drawings is to be interpreted as illustrative and not in a limiting sense.

Having thus described my invention, I claim as new and desire to protect by Letters Patent of the United States:

1. A cover assembly for disposition at the outer side of a vehicle wheel, comprising a trim ring, a hub member disposed centrally of said trim ring, a plurality of spoke members extending generally radially outwardly from said hub member and into engagement with said trim ring, and means for securing said spoke members to said hub member, each of said spoke members comprising an elongated member having a looped mid portion receiving said securing means and having its end portions extending generally radially outwardly into engagement with said trim ring, some of said spoke members having their end portions fixedly secured to said trim ring, the remainder of said spoke members having their end portions extending through and in frictional engagement with said trim rirng.

2. A cover assembly for disposition at the outer side of a vehicle wheel, comprising a trim ring, a hub member disposed centrally of said trim ring, a plurality of spoke members extending generally radially outwardly from said hub member and into engagement with said trim ring, and means for securing said spoke members to said hub member, each of said spoke members comprising an elongated member having a looped mid portion receiving said securing means and having its end portions extending generally radially outwardly into engagement with said trim ring, some of said spoke members having their end portions fixedly secured to said trim ring, the remainder of said spoke members having their end portions extending through and in frictional engagement with said trim ring, said securing means comprising a tubular rivet extending through said looped mid portion and the adjacent portion of said hub member.

3. A cover assembly for disposition at the outer side of a vehicle wheel, comprising a trim ring, a hub member disposed centrally of said trim ring, a first group of spaced spoke members extending generally radially outwardly from said hub member to said trim ring, a second group of spoke members intermediate the spoke members of said first group and extending generally radially outwardly from said hub member to said trim ring, means fixedly securing each of said spoke members of said first and second groups to said hub member, and means fixedly securing each of the spoke members of said first group to said trim ring, each of the spoke members of said second group extending through and in frictional engagement with said trim ring.

4. A cover assembly for disposition at the outer side of a vehicle wheel, comprising a trim ring, a hub member disposed centrally of said trim ring, a first group of spaced spoke members extending generally radially outwardly from said hub member to said trim ring, a second group of spoke members intermediate the spoke members of said first group and extending generally radially outwardly from said hub member to said trim ring, means fixedly securing each of said spoke members of said first and second groups to said hub member, and means fixedly securing each of the spoke members of said first group to said trim ring, each of the spoke members of said second group extending through and in frictional engagement with said trim ring, each of the spoke members of said first and second groups comprising an elongated member having a looped mid portion adjacent to said hub member for receiving said first named securing means, and a pair of diverging arms extending from said looped mid portion to said trim ring.

5. The combination of claim 4, said first named securing means comprising a tubular rivet extending through said looped mid portion and the adjacent portion of said hub member.

6. The combination of claim 5, said second named securing means comprising a fastener extending through said trim ring and into the arms of each of the spoke members of said first group.

7. A cover assembly for disposition at the outer side of a vehicle wheel, comprising a trim ring, a hub member disposed centrally of said trim ring, a first group of circumferentially spaced wire spoke members extending from said hub member to said trim ring, a second group of wire spoke members intermediate the spoke members of said first group and extending from said hub member to said trim ring, each of the spoke members of said first and second groups comprising a looped mid portion adjacent to said hub member and a pair of crossed arms spaced from each other and extending from said looped mid portion to said trim ring, means securing each of said looped portions to the adjacent portion of said hub member, means fixedly securing the arms of said first group of spoke members to said trim ring, the arms of said second group of spoke members extending through and in frictional engagement with said trim ring.

8. The combination of claim 7, each of the arms of said spoke members extending across and spaced from an arm of the adjacent spoke member.

9. The combination of claim 7, and a cover plate on said hub members and overlying said looped portions.

10. The combination of claim 7, said first named securing means comprising a tubular rivet extending through each of said looped portions and the adjacent portion of said hub member.

11. The combination of claim 10, said second named securing means comprising a fastener extending through said trim ring and into the arms of each of the spoke members of said first group.

12. A cover assembly adapted to be mounted to the axially outer side of a vehicle wheel, said assembly comprising an annular trim ring, a hub member concentric with said ring and including a circular portion extending approximately in a radial direction, a conical portion joined at one end to the periphery of said circular portion and extending axially inwardly and radially outwardly therefrom, and a flange portion joined to the other end of said conical portion and extending approximately radially outwardly therefrom and having an annular series of apertures extending therethrough, a plurality of wire spoke members, each of the spoke members comprising a looped mid-portion integral with a pair of crossed arm portions, each of said mid-portions lying in an approximately radial plane against said flange portion and in coaxial alignment with a respective one of said apertures, a plurality of fastening means each extending through a respective one of said mid-portions and its aligned aperture for securing said mid-portions to said flange portion, the outer ends of said arm portions being secured to said trim ring.

13. An assembly as recited in claim 12 and comprising a circular cover member coaxial with and secured to said hub member circular portion and extending over said spoke member mid-portion and located radially outwardly of the latter.

References Cited in the file of this patent

UNITED STATES PATENTS

| 2,676,850 | McLeod | Apr. 27, 1954 |

FOREIGN PATENTS

| 536,148 | France | 1922 |
| 714,587 | France | Sept. 7, 1931 |
| 528,365 | Great Britain | Oct. 28, 1940 |